Patented Aug. 28, 1923.

1,466,352

UNITED STATES PATENT OFFICE.

CLINTON E. DOLBEAR, OF SAN FRANCISCO, CALIFORNIA, ASSIGNOR TO INDUSTRIAL RESEARCH CO., OF SAN FRANCISCO, CALIFORNIA.

RECOVERING POTASSIUM FROM BRINES.

No Drawing. Application filed July 17, 1922. Serial No. 575,655.

*To all whom it may concern:*

Be it known that I, CLINTON E. DOLBEAR, a citizen of the United States, residing at the city and county of San Francisco and State of California, have invented certain new and useful Improvements in Recovering Potassium from Brines, of which the following is a specification.

My invention relates to the recovery of potassium.

Its object is to cause the precipitation of potassium and other valuable salts from brines containing a mixture of potassium and sodium salts.

The principle involved is based upon the fact that certain salts of potassium and sodium are quite insoluble in ammoniacal solution.

I have found that if ammonia is dissolved in such a brine as occurs at Searles Borax Lake, or at Deep Springs Valley, California, sodium sulphate, chiefly, is at first precipitated. As the solution becomes stronger with ammonia, sodium carbonate and potassium sulphate together with more sodium sulphate precipitate. When the ammonia absorbed by the brine amounts to a little over 20% of the weight of the original brine, approximately all of the carbonates and sulphates and over 90% of the borates contained in the original brine are precipitated therefrom, there remaining still in solution chlorides of sodium and potassium, together with a small quantity of borax.

I have also found that if the ammonia is added to the brine rapidly, almost no potassium salt is precipitated, while if the ammonia is added very slowly, the potassium is more completely precipitated.

It appears that the reason for this behavior is that the potassium exists in the brine as potassium chloride and that in order to become insoluble in the ammoniacal brine, it must react with the sodium sulphate present to form potassium sulphate and sodium chloride, and that for some obscure reason, this reaction is slow, so that the sodium sulphate precipitates out, and settles from the body of the brine before sufficient time elapses to allow of much potassium sulphate to form.

I have found that if the brine is so agitated that the precipitated sodium sulphate is kept suspended in the brine, during the ammoniacal treatment, then the reaction between the sodium sulphate and the potassium chloride proceeds to completion, and a large percentage of the potassium is precipitated as the sulphate.

In practice, I pass ammonia gas into the brine, keeping the brine in agitation, until the desired percentage of the potassium therein is precipitated. The amount of ammonia required appears to be somewhat dependent on the composition of the brine and varies say, for example, between fourteen and eighteen per cent of the weight of the original brine. When about eighteen per cent of ammonia has been added, the solubilities of the sodium carbonate, sodium sulphate and borax begin rapidly to decrease and when, say, 22% of ammonia is present, there has been precipitated all but a trace of both carbonate and sulphate, and all but about 0.05% of borax. These salts can be precipitated all together and afterward refined one from the other by well known methods, or the potassium sulphate mixed with some sodium sulphate and carbonate can be separated from the brine at a lower degree of saturation with ammonia, and the remaining carbonate, sulphate and borate of soda in the brine afterward precipitated by addition of more ammonia, and thus a partial separation of the salts effected.

After the separation of the precipitated salts from the ammoniacal brine, I recover the ammonia from the brine by any of the well known methods and use this same ammonia again and again, to effect precipitation of the salts from more brine. Thus the precipitating agent is used over and over and with very small loss of ammonia.

The great advantage of this method of recovery of potassium and other salts from brine is the very small cost of operation, since evaporating of the brine with its attendant difficulties and cost is eliminated. The cost per unit of potassium salt recovered is but a fraction of the cost of recovery by evaporation.

I claim:—

1. The method of recovering potassium from a potassium bearing brine, comprising adding ammonia to the brine, and keeping the first precipitated salt in suspension in the brine, until the potassium is precipitated.

2. The method of recovering potassium from potassium bearing brine, comprising adding ammonia to the brine and keeping the brine in a state of agitation.

3. The method of recovering potassium from brines containing potassium and sodium salts, comprising the precipitation of the sodium salt by the addition to the brine of ammonia, and during the ammoniacal treatment keeping the precipitated sodium salt in suspension throughout the body of the brine, until the soluble potassium salt reacts with said suspended sodium salt to form an insoluble precipitatable potassium salt.

4. The method of recovering potassium from brines containing sodium sulphate and potassium chloride, comprising the precipitation of the sodium sulphate by the addition to the brine of ammonia, and during the ammoniacal treatment keeping the precipitated sodium sulphate in suspension throughout the body of the brine, until the potassium chloride reacts with said suspended sodium sulphate to form potassium sulphate and sodium chloride.

5. The method of recovering potassium from brines containing potassium and sodium salts, comprising the precipitation of the sodium salt by the addition to the brine of ammonia, and during the ammoniacal treatment keeping the brine in a state of agitation to maintain the precipitated sodium salt in suspension therein, until by reaction with said suspended sodium salt, the potassium salt in the brine is converted into an insoluble precipitatable potassium salt.

6. The method of recovering potassium from brines containing sodium sulphate and potassium chloride, comprising the precipitation of the sodium sulphate by the addition to the brine of ammonia, and during the ammoniacal treatment keeping the brine in a state of agitation to maintain the precipitated sodium sulphate in suspension therein, until by reaction with said sodium sulphate the potassium chloride is converted into potassium sulphate.

In testimony whereof I have signed my name to this specification.

CLINTON E. DOLBEAR.